United States Patent Office

2,912,373
Patented Nov. 10, 1959

2,912,373

POLYMERIZATION OF FLUOROETHYLENE MONOMERS

Norman G. Carlson, White Bear Lake, Minn., assignor to Minnesota Mining and Manufacturing Company, St. Paul, Minn., a corporation of Delaware No Drawing. Application November 8, 1957
Serial No. 695,199

9 Claims. (Cl. 204—163)

This invention relates to suspensoids of polymerized poly-fluorinated ethylenes and more particularly to the process of preparing such suspensoids directly from polyfluorinated ethylene monomers.

Polytetrafluoroethylene can be extruded to form filaments, tubes and the like only with relatively great difficulty, owing to the high viscosity of the polymer at its melting point. It is necessary to prepare this material to be extruded in a finely divided dry state, having uniform particle size, if successful extrusion is to be secured. Such finely divided material can be obtained quite conveniently by preparing a dispersoid or suspensoid in a suitable dispersing medium such as water, from which it can be removed and dried. However, it is known that not every method for producing dispersions or suspensions yields material which can successfully be used for extrusion.

Heretofore it has been particularly difficult to produce relatively stable suspensoids of tetrafluoroethylene having suitable and uniform particle sizes from which the coagulated and dried polymer may be easily and practically extruded and sintered to form strong filaments and films. This has been accomplished only by incorporating into aqueous emulsion polymerization systems including tetrafluoroethylene monomer, certain peroxides of saturated aliphatic dibasic acids having four to five carbon atoms as catalysts. In the absence of such peroxide catalysts, extruded forms prepared from the suspensoids heretofore available have never been sufficiently coherent to maintain their shapes during necessary handling before sintering nor have they formed usefully strong shapes after sintering. Furthermore, although it has been possible to form useful extruded shapes such as filaments and films from polytetrafluoroethylene if the aforementioned peroxides are used as catalysts in the polymerization, certain difficulties have also attended the polymerization process itself. Thus, owing to the extremely corrosive nature of the peroxides, corrosion has been a problem in storage, handling and production equipment. In addition, it has been necessary to use extreme caution to avoid personal contact with peroxide-containing mixtures as well as to avoid the explosion of and/or rapid burning of these mixtures. It has been necessary to carry out the reaction in strongly acid media since the peroxides decompose rapidly at a pH of 4.5 or higher. Consequently, fluoroethylenes cannot be successfully copolymerized with acid-unstable monomers by this process. Still another disadvantage of the prior known processes involving peroxides is the discoloration of the ultimately extruded articles because of the presence of residual peroxide catalyst.

It is an object of the present invention to provide an efficient and practical process for the emulsion polymerization of polyfluorinated ethylenically-unsaturated monomers. It is another object of the present invention to provide a process for the emulsion polymerization of fluorinated ethylenically-unsaturated monomers, whereby there is produced a useful stable polymeric suspensoid and which process is free from the particular disadvantages of the peroxide-catalyzed process. It is a further object of the invention to provide an extrusion paste from which strong and useful extruded and sintered polytetrafluoroethylene shapes can be fabricated. Other objects of the invention will be apparent from the following disclosure.

In accordance with the above and other objects of the present invention, it has been found that a useful suspensoid of the polymer of a highly fluorinated ethylenically unsaturated monomer, from which strongly cohesive extruded shapes may be easily prepared, can readily be obtained by contacting the said highly fluorinated ethylenically unsaturated monomer with an aqueous solution of a compound of the group consisting of keto acids and water-soluble derivatives thereof, said acids being chosen from the groups represented by the formulae:

and

wherein R is a lower alkyl, carboxy or lower carboxyalkyl radical, R' is a lower carboxyalkyl or lower sulfoalkyl radical, and R" is a lower carboxyalkyl radical, and subjecting the solution to actinic radiation.

In this manner, there is produced a finely divided relatively stable suspension of a polymer of the fluorinated monomer, and this solid, finely divided polymer suspension can be coagulated and separated from the aqueous phase and dried. The dried powder is especially well adapted for extrusion and sintering to produce articles of various shapes comprised of the said polymer, such articles being characterized by their marked strength and excellent appearance. Thus, the process of the present invention produces easily and without complication products which in the case of polytetrafluoroethylene could only be produced heretofore with considerable difficulty using a very specific and difficultly handled group of catalysts. The process employing the catalysts of the invention is also operative when used to polymerize other polyfluorinated ethylenic monomers, such as chlorotrifluoroethylene.

Broadly speaking, the process as herein defined is carried out in accordance with known general procedures. Pressures of from 1 to 100 atmospheres and temperatures of reaction of from about 0° C. to 200° C. or higher can be used, the preferred range of pressure being from 1 to 30 atmospheres and the preferred temperature being in the range of from about 0° C. to about 100° C. Amounts of from 0.001 to 3 percent by weight of the catalysts, based on the weight of monomer, can be used successfully and it is preferred to use about 0.005 to 2 percent of the selected catalyst of the invention.

The process of the invention may be conveniently carried out batchwise to produce moderate amounts of polymer by charging the catalyst, together with a large amount of water and the highly fluorinated ethylenically unsaturated monomer (as a liquid or a gas under pressure), to a heavy-walled pressure vessel which is arranged so that its contents may be effectively irradiated. Air is removed from the pressure vessel, it is sealed and irradiated (with or without agitation) until the polymerization is essentially complete. A drop in pressure accompanies the polymerization. The emulsion (suspensoid) can then be coagulated as by the addition of a coagulating agent such as a solvent, for example, acetone; or by rapid, high shear agitation. The coagulated polymer is removed, as by filtration or centrifugation and dried. This dried polymer can be stored until required. A useful extrusion paste can be prepared by mixing a suitable liquid hydrocarbon (i.e. preferably nonvolatile at room temperature) with the dried polymer.

For substantially continuous or batchwise production of larger amounts of polymer by the process of the invention, the water, catalyst and monomer can be charged to a mixing tank, mixed and then passed under pressure through an irradiating chamber, which may consist of a series of glass-walled or quartz tubes which are subjected to strong illumination with ultraviolet light. From this irradiating chamber the mixture is led, still under pressure, to a vessel in which polymerization proceeds, recirculation through the irradiation chamber being employed to carry the polymerization to the desired point. From the latter vessel the suspension of polymer is fed to a coagulating tank, and the coagulated polymer is filtered off in the usual manner (still under pressure, if desired), and dried.

Emulsifying agents can be employed in the process of the invention, although this is not necessary for successful operation. Suitable emulsifying agents include, for example, the emulsifying agents disclosed in U.S. Patent 2,559,752. Other desired additives can also be included in the polymerization mixture, as, for example, hydrocarbons such as paraffins, oils, and the like; as well as other ethylenic monomers, so that the polyfluorinated monomer is in whole or part copolymerized.

Irradiation of the polymerization mixture is carried out under such conditions that the irradiation is of sufficient intensity and employed for a time sufficient to produce substantial polymerization. A convenient source of the actinic radiation required for the operation of the present process has been found to be an air-cooled, high pressure mercury vapor lamp which draws from about 900 to 1000 watts through about a one inch arc operating under 200 atmospheres pressure, which has a brightness of about 65,000 lumens and of which about 10 percent of the total emitted radiation is of wave lengths shorter than about 3000 A. and occurs as a fairly continuous emission spectrum extending to about 2200 A. except in the vicinity of 2550 to 2600 A. Such a lamp is available commercially from the General Electric Company under the designation B–H6. In any case, it is known that to be effective in producing the activation, the radiation must be absorbed by the water-soluble catalyst which is used. To determine the most effective wavelength of ultraviolet light to be used with any catalyst, it is necessary only to determine the UV absorption spectrum of the compound selected, and then employ light of such wavelengths as will be absorbed.

The pH of the polymerization mixture is not critical. Ordinarily, the acid employed causes the aqueous solution to have a pH below pH 7. However, if desired, the solution may be adjusted to be neutral or even somewhat basic, without interfering with successful polymerization.

Any acid-group linked derivative of the keto-acids used as catalysts herein, which is soluble in water to the extent of at least about 0.0004 percent can be used. Included within the scope of such derivatives are the metallic and ammonium salts, lower alkyl esters, amides, amine salts, halides and the like, including derivatives which can react with water to produce the keto-acids. Illustrative compounds suitable for use in the present invention are the following: 2-ketoglutaric acid, levulinic acid, 3,6-diketo sebacic acid, 3-keptopimelic acid, aceto-acetic acid, aceto-acetic ester, 3-keto-n-caprylic acid, 4-ketoazelaic acid, acetoacetamide, the monoamide of 3-ketopimelic acid, alkali metal salts of the foregoing acids, for example the sodium and potassium salts, etc.

Having thus broadly described the process of the invention, there are appended several specific examples of its operation, which are to be understood as illustrative only and not to be construed as being limiting in any sense. All parts are by weight unless otherwise noted.

EXAMPLE 1

About 0.25 part of 3-keto pimelic acid is charged to a heavy-walled glass ampoule. 250 parts of deoxygenated, distilled water are then added to the ampoule, the ampoule is cooled to liquid air temperature and 100 parts of tetrafluoroethylene monomer are admitted (and immediately frozen). The ampoule is then sealed under vacuum, allowed to warm to approximately room temperature, placed partially submerged in a 75° C. water bath and irradiated with agitation for 15½ hours under a General Electric B–H6 lamp at a distance of approximately 6 inches. The ampoule is opened and the negligible pressure of unreacted monomer indicates approximately quantitative conversion. A certain amount of precoagulum is present.

Three other lots are run which are identical to the first except that 0.0 parts, 0.75 part and 2.00 parts of 3-keto pimelic acid are used respectively. The emulsions resulting from the four lots have the following solids concentrations, as determined by drying aliquot parts of the latexes overnight at 100° C., and weighing.

| Parts keto acid: | Percent solids |
|---|---|
| 0.0 | 0.0 |
| 0.25 | 3.1 |
| 0.75 | 3.9 |
| 2.0 | 1.4 |

To obtain solid polymer from the emulsions obtained and set forth above, each emulsion is placed in a vessel equipped with a high-speed agitator and thoroughly stirred until coagulation is complete (within about five to ten minutes). The coagulated polymer is then filtered off, dried in an oven over night at a temperature of about 100° C., and stored until required for use.

For the preparation of extruded constructions from the dried polymer, the polymer is mixed with about 15 percent of its weight of No. 10 base paraffin oil to form an extrusion paste which is allowed to stand overnight to permit the oil to become intimately mixed with the polymer. This paste is then placed in the conventional extruding apparatus, and is extruded into filaments, films, or the like. The extruded constructions are subjected to extraction with trichloroethylene to remove the paraffin oil and the extracted structure is then sintered in a salt bath at a temperature of about 327° C. or above until complete sintering has taken place as indicated by occurrence of translucency throughout the sample. The extruded constructions thus prepared are light colored, clear and possess marked tensile strength.

EXAMPLE 2

The procedure of Example 1 is repeated, except that 2-keto-glutaric acid is used instead of 3-ketopimelic acid. About one-half part of the keto glutaric acid is used together with about one-half part of ammonium perfluorocaprylate, which is added as an emulsifier. When the ampoule is opened, there is no pressure, indicating that substantially all of the tetrafluoroethylene has been polymerized. The elulsion is a milky liquid containing 11.0 percent solids.

When the above procedure is repeated, except that the emulsifier is not included, a milky emulsion is obtained in which substantially all of the tetrafluoroethylene originally present has been polymerized to form polytetrafluoroethylene.

EXAMPLE 3

The process described in claim 1 is followed, using a number of different catalysts employing emulsifiers and added paraffin wax in some cases. The results obtained are shown in the following table.

Table 1

| Catalyst | parts | Emulsifier | parts | Wax + or − [1] | precoag- ulum | Appear- ance | Solids content, percent |
|---|---|---|---|---|---|---|---|
| Levulinic acid | 0.5 | ammonium perfluoro- caprylate. | 0.5 | + | + | milky | 7.7 |
|  | 0.5 |  |  | + | − | milky | 16.6 |
|  | 0.5 |  |  | − | ++ | clear | (²) |
|  | 0.008 |  |  |  |  |  | 9.0 |
| Sodium Levulinate | 0.5 |  |  |  |  | milky | 2.9 |
| Acetone sulfonic acid | 0.5 |  |  | + | + | milky | 6.5 |
|  | 1.0 |  |  | + | + | milky | 5.8 |
| Dimethyl diketo sebacate | 0.75 |  |  | + |  | clear | 1.2 |
| 3-keto pimelic acid | 0.004 | ammonium perfluoro- capyrlate. | 0.5 | − | − | milky | 18.5 |
|  | 0.15 |  |  |  |  |  |  |
| potassium 3-keto-butane sulfonate | 0.5 |  |  | + | ± | milky | 5.5 |
| sodium 3-keto-butane sulfonate | 0.5 |  |  | + | ± | milky | 13.0 |
| sodium 3-keto pimelate | 0.5 |  |  | + | + | milky | 6.0 |
| 3-keto-pimelic acid | 0.5 |  |  | + | ± | milky | 3.2 |
|  | 0.5 | ammonium acetate acetic acid | 1.5 1.0 | + | ± | clear | 2.58 |
|  | 2.0 |  |  | + | − | clear | 3.1 |
|  |  |  |  | − | +++ |  | 1.4 |

[1] 0.5 part of paraffin wax, M.P. 52–56° C. added to the system.
² Exact amount not determined; estimated at 10 percent.

EXAMPLE 4

About .02 gram of 2-keto-glutaric acid is charged to a heavy-walled glass ampoule. 10 milliliters of deoxygenated distilled water are added, the ampoule is cooled to liquid air temperature and 4.3 grams of monochlorotrifluoroethylene monomer are admitted (and immediately frozen). The ampoule is then sealed under vacuum, allowed to warm to approximately room temperature, placed partly submerged in a 75° C. water bath and irradiated with agitation for approximately 17 hours under a General Electric B–H6 lamp at a distance of approximately 8 inches. An emulsion having a solids concentration of 13.6 percent is recovered upon opening the ampoule.

The run is repeated except that 3-keto pimelic acid is used as the catalyst in place of 2-keto glutaric acid. An emulsion containing 9.7 percent of solids is recovered from this run.

The terms and expressions which have been employed are used as terms of description and not of limitation, and it is not intended, in the use of such terms and expressions, to exclude any equivalents of the feature shown and described or portions thereof, but it is recognized that various modifications are possible within the scope of the invention claimed:

What is claimed is:

1. A process for preparing a suspensoid of polyfluoroethylene polymers which comprises contacting at least one polyfluoroethylene monomer at a temperature of about 0° C. to about 200° C. under a pressure of about 1 to 100 atmospheres with an aqueous solution of an amount sufficient to catalyze the polymerization of said monomer of a compound of the group consisting of keto-acids and water-soluble derivatives thereof, the said acids being represented by the formulae

and

wherein R is a member of the group consisting of lower alkyl, lower carboxyalkyl and carboxy radicals, R' is a member of the group consisting of lower carboxyalkyl and lower sulfoalkyl radicals and R" is a lower carboxyalkyl radical, and subjecting the said solution to the action of actinic radiation.

2. The process for preparing a suspensoid of a polymer of a highly fluorinated ethylenically unsaturated monomer which comprises contacting at least one highly fluorinated unsaturated monomer at a temperature in the range of from about 0° C. to about 200° C. under a pressure of at least 15 pounds per square inch with an aqueous solution of an amount less than about 3 percent of the weight of said monomer but sufficient to catalyze the polymerization thereof, of a compound of the group consisting of keto acids and water-soluble derivatives thereof, the said acids being represented by the formulae:

and

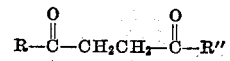

wherein R is a member of the group consisting of lower alkyl, lower carboxyalkyl and carboxy radicals, R' is a member of the group consisting of lower carboxyalkyl and lower sulfoalkyl radicals and R" is a lower carboxyalkyl radical, and irradiating the said solution with ultraviolet light at an intensity and for a time sufficient to bring about substantial polymerization.

3. The process for preparing a suspensoid of polytetrafluoroethylene which comprises contacting tetrafluoroethylene at a temperature in the range of about 0° C. to about 100° C. under a pressure of at least 15 pounds per square inch with an aqueous solution of an amount less than about 3 percent of the weight of the said tetrafluoroethylene but sufficient to catalyze the polymerization thereof of a compound of the group consisting of keto-acids and water-soluble derivatives thereof, and said acids being represented by the formulae:

and

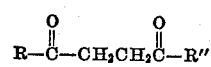

wherein R is a member of the group consisting of lower alkyl, lower carboxyalkyl and carboxy radicals, R' is a member of the group consisting of lower carboxyalkyl and lower sulfoalkyl radicals and R" is a lower carboxyalkyl radical, and irradiating the said solution with ultraviolet light at an intensity and for a time sufficient to bring about substantial polymerization.

4. The process for preparing a suspensoid of polychlorotrifluoroethylene which comprises contacting chlorotrifluoroethylene monomer at a temperature in the range of about 0° C. to about 100° C. under a pressure of at least 15 pounds per square inch with an aqueous solution of an amount less than about 3 percent of the weight of the said chlorotrifluoroethylene monomer but sufficient to catalyze the polymerization thereof of a compound of the group consisting of keto acids and water-soluble derivatives thereof, the said acids being represented by the formulae:

and

wherein R is a member of the group consisting of lower alkyl, lower carboxyalkyl and carboxy radicals, R' is a member of the group consisting of lower carboxylalkyl and lower sulfoalkyl radicals and R'' is a lower carboxyalkyl radical, and irradiating the said solution with ultraviolet light at an intensity and for a time sufficient to bring about substantial polymerization.

5. The process for preparing a suspensoid of polytetrafluoroethylene which comprises contacting tetrafluoroethylene monomer at a temperature in the range of about 0° C. to about 100° C. and at a pressure in the range of from about one to 30 atmospheres, with an aqueous solution containing levulinic acid in an amount less than about 3 percent based upon the weight of said monomer but sufficient to catalyze the polymerization thereof, and subjecting the said solution to actinic radiation.

6. The process for preparing a suspensoid of polytetrafluoroethylene which comprises contacting tetrafluoroethylene at a temperature in the range of about 0° C. to about 100° C. and at a pressure in the range of from about one to 30 atmospheres, with an aqueous solution containing 2-ketoglutaric acid in an amount less than about 3 percent by weight based upon the weight of said monomer but sufficient to catalyze the polymerization thereof, and subjecting the solution to actinic radiation.

7. The process for preparing a suspensoid of polytetrafluoroethylene which comprises contacting tetrafluoroethylene at a temperature in the range of about 0° C. to about 100° C. and at a pressure in the range of from about one to 30 atmospheres, with an aqueous solution containing 3-keto pimelic acid in an amount less than about 3 percent by weight based upon the weight of said monomer but sufficient to catalyze the polymerization thereof, and subjecting the solution to actinic radiation.

8. The process for preparing a suspensoid of polytetrafluoroethylene which comprises contacting tetrafluoroethylene at a temperature in the range of about 0° C. to about 100° C. and at a pressure in the range of from about one to 30 atmospheres, with an aqueous solution containing an alkali metal salt of 3-keto butane sulfonic acid in an amount less than about 3 percent by weight based upon the weight of said monomer but sufficient to catalyze the polymerization thereof, and subjecting the solution to actinic radiation.

9. The process for preparing a suspensoid of polytetrafluoroethylene which comprises contacting tetrafluoroethylene at a temperature in the range of about 0° C. to about 100° C. and at a pressure in the range of from about one to 30 atmospheres, with an aqueous solution containing acetone sulfonic acid in an amount less than about 3 percent by weight based upon the weight of said monomer but sufficient to catalyze the polymerization thereof, and subjecting the solution to actinic radiation.

References Cited in the file of this patent

UNITED STATES PATENTS 2,816,082    Brinker et al. _____ Dec. 10, 1957